(12) United States Patent
Gorton, Jr.

(10) Patent No.: US 8,024,719 B2
(45) Date of Patent: Sep. 20, 2011

(54) BOUNDED HASH TABLE SORTING IN A DYNAMIC PROGRAM PROFILING SYSTEM

(75) Inventor: Richard C. Gorton, Jr., Framingham, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 400 days.

(21) Appl. No.: 12/263,910

(22) Filed: Nov. 3, 2008

(65) Prior Publication Data

US 2010/0114915 A1    May 6, 2010

(51) Int. Cl.
*G06F 9/45* (2006.01)

(52) U.S. Cl. .......................................... 717/158; 707/747

(58) Field of Classification Search .................. None
See application file for complete search history.

(56) References Cited

U.S. PATENT DOCUMENTS

| | | | |
|---|---|---|---|
| 3,704,363 A | | 11/1972 | Salmassy et al. |
| 4,969,164 A | | 11/1990 | Mehta et al. |
| 5,046,068 A | | 9/1991 | Kubo et al. |
| 5,257,215 A | | 10/1993 | Poon |
| 5,339,266 A | | 8/1994 | Hinds et al. |
| 5,386,375 A | | 1/1995 | Smith |
| 5,515,308 A | | 5/1996 | Karp et al. |
| 5,546,593 A | | 8/1996 | Kimura et al. |
| 5,619,439 A | | 4/1997 | Yu et al. |
| 5,745,902 A | * | 4/1998 | Miller et al. ........................... 1/1 |
| 5,768,592 A | * | 6/1998 | Chang ............................ 438/758 |
| 5,832,510 A | * | 11/1998 | Ito et al. ......................... 711/100 |
| 5,835,705 A | | 11/1998 | Larsen et al. |
| 5,950,003 A | * | 9/1999 | Kaneshiro et al. ............ 717/130 |
| 5,954,789 A | | 9/1999 | Yu et al. |
| 6,018,759 A | | 1/2000 | Doing et al. |
| 6,052,708 A | | 4/2000 | Flynn et al. |
| 6,076,157 A | | 6/2000 | Borkenhagen et al. |
| 6,088,788 A | | 7/2000 | Borkenhagen et al. |
| 6,088,800 A | | 7/2000 | Jones et al. |
| 6,105,127 A | | 8/2000 | Kimura et al. |
| 6,131,104 A | | 10/2000 | Oberman |
| 6,212,544 B1 | | 4/2001 | Borkenhagen et al. |
| 6,249,906 B1 | * | 6/2001 | Levine et al. .................. 717/153 |

(Continued)

OTHER PUBLICATIONS

Phase Tracking and Prediction, Sherwood et al, Proceedings of the30th annual international symposium on computer architecture (ISCA'03), 2003.*

(Continued)

*Primary Examiner* — Pierre Vital
*Assistant Examiner* — Augustine Obisesan
(74) *Attorney, Agent, or Firm* — Rory D. Rankin; Meyertons, Hood, Kivlin, Kowert & Goetzel, P.C.

(57) ABSTRACT

A system and method for efficient bounded hash table sorting during dynamic whole program profiling of software applications. A computing system comprises a dynamic binary instrumentation (DBI) tool coupled to a virtual machine configured to translate and execute binary code of a software application. The binary code is augmented with instrumentation and analysis code during translation and execution. A dynamic binary analysis (DBA) tool identifies hierarchical layers of cycles within the application that describe the dynamic behavior of the application. Corresponding characterization information is stored in a hash table. Periodic sorting of entries of the hash table occur for highly accessed entries in deep buckets within the hash table. Repositioning the entries within the hash table may reduce pointer chasing problems and identify program phase changes within the dynamic behavior of the application.

12 Claims, 11 Drawing Sheets

U.S. PATENT DOCUMENTS

| | | |
|---|---|---|
| 6,282,554 B1 | 8/2001 | Abdallah et al. |
| 6,341,347 B1 | 1/2002 | Joy et al. |
| 6,349,319 B1 | 2/2002 | Shankar et al. |
| 6,357,016 B1 | 3/2002 | Rodgers et al. |
| 6,397,239 B2 | 5/2002 | Oberman et al. |
| 6,415,308 B1 | 7/2002 | Dhablania et al. |
| 6,427,196 B1 | 7/2002 | Adiletta et al. |
| 6,434,699 B1 | 8/2002 | Jones et al. |
| 6,496,925 B1 | 12/2002 | Rodgers et al. |
| 6,507,862 B1 | 1/2003 | Joy et al. |
| 6,523,050 B1 | 2/2003 | Dhablania et al. |
| 6,553,564 B1 * | 4/2003 | Alexander et al. ............ 717/128 |
| 6,564,328 B1 | 5/2003 | Grochowski et al. |
| 6,567,839 B1 | 5/2003 | Borkenhagen et al. |
| 6,594,681 B1 | 7/2003 | Prabhu |
| 6,625,654 B1 | 9/2003 | Wolrich et al. |
| 6,629,236 B1 | 9/2003 | Aipperspach et al. |
| 6,629,237 B2 | 9/2003 | Wolrich et al. |
| 6,651,243 B1 * | 11/2003 | Berry et al. .................. 717/130 |
| 6,658,652 B1 * | 12/2003 | Alexander et al. ............ 717/128 |
| 6,668,308 B2 | 12/2003 | Barroso et al. |
| 6,668,317 B1 | 12/2003 | Bernstein et al. |
| 6,671,827 B2 | 12/2003 | Guilford et al. |
| 6,681,345 B1 | 1/2004 | Storino et al. |
| 6,687,838 B2 | 2/2004 | Orenstien et al. |
| 6,694,347 B2 | 2/2004 | Joy et al. |
| 6,694,425 B1 | 2/2004 | Eickemeyer |
| 6,697,935 B1 | 2/2004 | Borkenhagen et al. |
| 6,701,515 B1 * | 3/2004 | Wilson et al. ................. 717/117 |
| 6,728,845 B2 | 4/2004 | Adiletta et al. |
| 6,728,955 B1 * | 4/2004 | Berry et al. .................. 717/158 |
| 6,748,556 B1 | 6/2004 | Storino et al. |
| 6,801,997 B2 | 10/2004 | Joy et al. |
| 6,820,107 B1 | 11/2004 | Kawai et al. |
| 6,847,985 B1 | 1/2005 | Gupta et al. |
| 6,857,064 B2 | 2/2005 | Smith et al. |
| 6,883,107 B2 | 4/2005 | Rodgers et al. |
| 6,889,319 B1 | 5/2005 | Rodgers et al. |
| 6,898,694 B2 | 5/2005 | Kottapalli et al. |
| 7,581,175 B1 * | 8/2009 | Skwirblies .................... 715/239 |
| 2003/0066055 A1 * | 4/2003 | Spivey .......................... 717/131 |
| 2005/0050223 A1 * | 3/2005 | Roeder et al. ................. 709/238 |
| 2006/0212243 A1 * | 9/2006 | Levine et al. .................. 702/79 |
| 2006/0242636 A1 * | 10/2006 | Chilimbi et al. .............. 717/158 |
| 2007/0150696 A1 * | 6/2007 | Theodore Hack ............ 711/220 |
| 2007/0288908 A1 * | 12/2007 | Cain et al. .................... 717/130 |

OTHER PUBLICATIONS

Discovering and exploiting program phases, Sherwood et al , IEEE 2003.*

Dynamic hash table, Larson et al, ACM vol. 31, No. 4, Apr. 1988.*

Efficient path profiling, Ball et al, IEEE 1996.*

Continuous profiling: where have all the cycles gone? Anderson et al, ACM Transactions on Computer Systems (TOCS) TOCS vol. 15 Issue 4, Nov. 1997.* gprof: A call graph execution profiler, Graham et al, ACM 1982.*

Targeted path profiling: Lower overhead path profiling for staged dynamic optimization systems, Joshi et al, Proceedings of the international symposium on code generation and optimization (CGO'04), 2004.*

Checking program profiles, Moseley et al., SCAM'03 2003.*

Whole execution traces, Zhang et al, Proceedings of the 37th International symposium on Michroarchitecture (MICRO-37' 04), 2004.*

Tulsen et al., "Power-sensitive multithreaded architecture," IEEE 2000, pp. 199-206.

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202, 1996.

Smith, "The End of Architecture," May 29, 1990, pp. 10-17.

Alverson et al., "Tera Hardware-Software Cooperation," 16 pages, 1997.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Uhrig, et al., "Implementing Real-Time Scheduling Within a Multithreaded Java Microcontroller," 8 pages, 2002.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages, 2002.

Eberle, et al., "Cryptographic Processor for Arbitrary Elliptic Curves over GF(2m)," 11 pages, 2003.

* cited by examiner

BOUNDED HASH TABLE SORTING IN A DYNAMIC PROGRAM PROFILING SYSTEM

BACKGROUND OF THE INVENTION

1. Field of the Invention

This invention relates to high performance computing systems, and more particularly, to performing bounded hash table sorting during dynamic program profiling of software applications.

2. Description of the Relevant Art

Software programmers write applications to perform work according to an algorithm or a method. The program's performance may be increased based on an understanding of the dynamic behavior of the entire program. Inefficient portions of the program may be improved once the inefficiencies are known. The following program information may aid in describing a program's dynamic behavior such as code coverage, call-graph generation, memory-leak detection, instruction profiling, thread profiling, race detection, or other. In addition, understanding a program's dynamic behavior may be useful in computer architecture research such as trace generation, branch prediction techniques, cache memory subsystem modeling, fault tolerance studies, emulating speculation, emulating new instructions, or other. Generally speaking, what is needed is a description of a program's entire control flow including loop iterations and inter-procedural paths.

Accurate instruction traces are needed to determine a program's dynamic behavior by capturing a program's dynamic control flow, not just its aggregate behavior. Programmers, compiler writers, and computer architects can use these traces to improve performance. An approach to obtain instruction traces is to build a simulator, execute applications on it, and collect and compress the resulting information. This approach requires a large amount of memory and a large amount of time to complete the process. Further, a simulator may not accurately capture the dynamic behavior of the application executing on a particular hardware system (e.g., since the simulator may be operating on statistical data).

In order to reduce both memory storage and execution time required to collect data, another approach is to perform profiling on only a small subset of the application. Yet other approaches investigate only memory reference traces. Also, hot path profiling measures the frequency and cost of a program's executed paths. It is an essential technique to understand a program's control flow. However, many current path profiling techniques only capture acyclic paths. Acyclic paths end at loop iteration and procedure boundaries, and, therefore, these paths do not describe the program's flow through procedure boundaries and loop iterations. These approaches do not capture whole program profiling of the application.

Further, a popular manner to hold data regarding the behavior of a program is to store it in a hash table. Depending upon the size of the hash table and the chosen hash function, the length of any given slot in a hash table may be appreciably deep. When a particular program region is determined to be hot, and the data corresponding to that region is indexed in the hash table upon every occurrence of the hot region, a large number of accesses to the hash table may be required. This large number of accesses may result in enormous overhead due to the pointer chasing problem, or memory serialization effects associated with indirect memory addressing. In the context of a program profiler, the number of collected paths may be large. Coupled with size restraints on the width of a hash table, the hash table will necessarily become deep at some point. Once this happens, the pointer chasing overhead becomes a major factor in the performance of the instrumented application.

In view of the above, efficient methods and mechanisms for maintaining efficient bounded hash table sorting during dynamic whole program profiling of software applications is desired.

SUMMARY OF THE INVENTION

Systems and methods for efficient bounded hash table sorting during dynamic whole program profiling of software applications.

In one embodiment, a computing system is provided comprising a dynamic binary instrumentation (DBI) tool coupled to a virtual machine configured to translate and execute binary code of a software application. The binary code is augmented with instrumentation and analysis code during translation and execution. Characterization information of each basic block is stored as each basic block is executed. This information is inspected by a dynamic binary analysis (DBA) tool in order to identify hierarchical layers of cycles within the application that describe the dynamic behavior of the application. For example, a sequence of basic blocks may describe paths, a sequence of paths may describe a stratum, and a sequence of strata may describe a stratum layer.

Corresponding data of hierarchical layers may be stored in entries of a hash table comprising a plurality of buckets, wherein the buckets comprise a plurality of entries. The hash table may be periodically sorted in order to position highly accessed, or "hot" entries, for easier access. Also, pointer chasing may be reduced by this periodic sorting. A bucket may be determined to need sorting if the bucket is deep enough, or the bucket has a number of entries exceeding a predetermined depth threshold. Only particular entries within a bucket may be determined to need sorting if the particular entries have been accessed a number of times exceeding a predetermined frequency threshold.

In another embodiment, a computer readable storage medium stores program instructions operable to inspect stored characterization information of basic blocks as the corresponding software application executes. The instructions identify hierarchical layers of cycles within the application that describe the dynamic behavior of the application. Corresponding data of the hierarchical layers, such as basic blocks, paths, strata, and stratum layers, may be stored in a hash table. The instructions may periodically sort only highly accessed entries of a qualifying bucket as described above.

Figure 1:
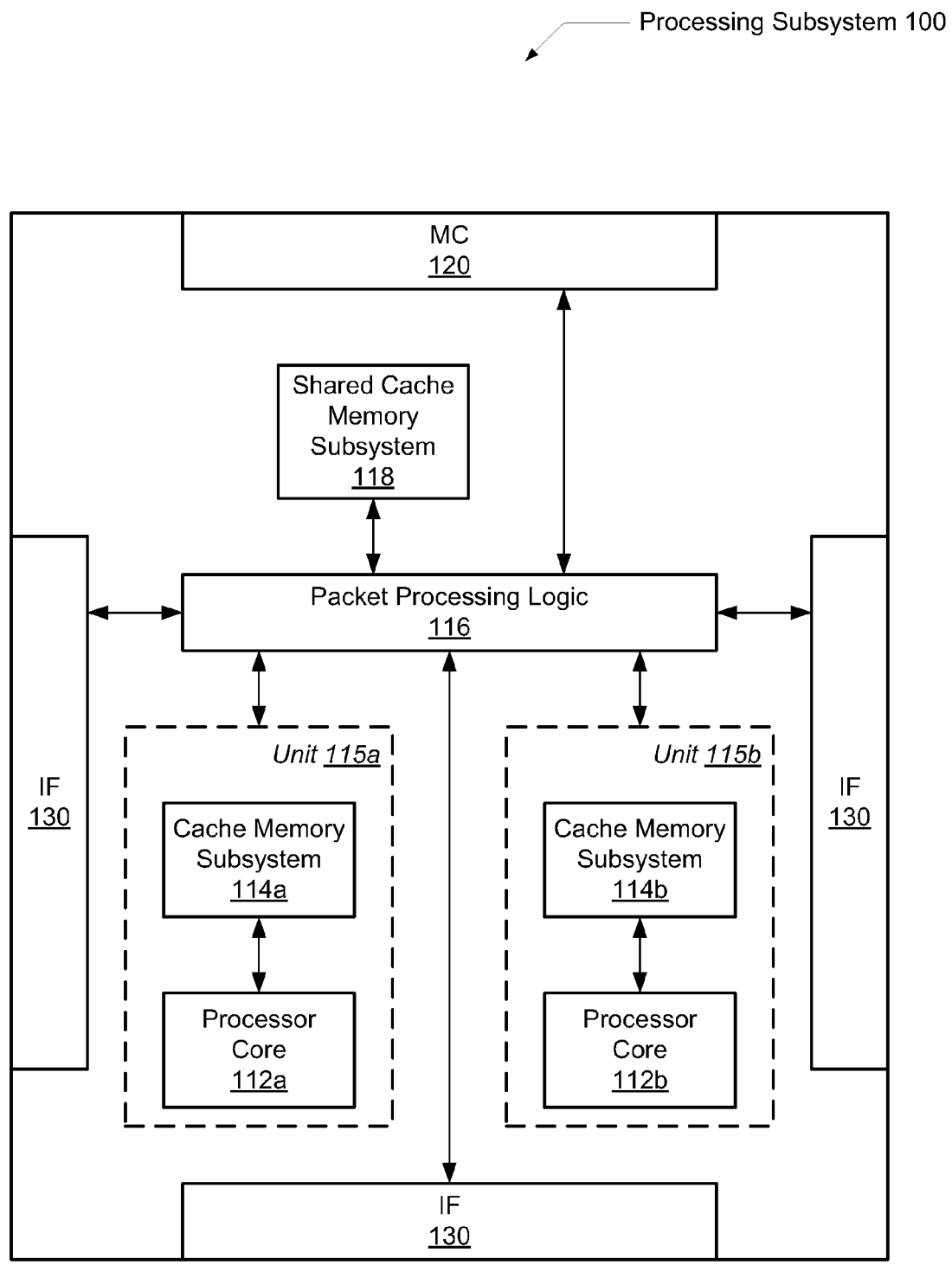
FIG. 1 is a generalized block diagram illustrating one embodiment of an exemplary processing subsystem.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

FIG. 1 is a block diagram of one embodiment of an exemplary processing subsystem 100. Processing subsystem 100 may include memory controller 120, interface logic 130, one or more processing units 115, which may include one or more processor cores 112 and a corresponding cache memory subsystems 114; packet processing logic 116, and a shared cache memory subsystem 118. Processing subsystem 100 may be a node within a multi-node computing system. In one embodiment, the illustrated functionality of processing subsystem 100 is incorporated upon a single integrated circuit.

Processing subsystem 100 may be coupled to a respective memory via a respective memory controller 120. The memory may comprise any suitable memory devices. For example, the memory may comprise one or more RAMBUS dynamic random access memories (DRAMs), synchronous DRAMs (SDRAMs), DRAM, static RAM, etc. Processing subsystem 100 and its memory may have its own address space from other nodes, or processing subsystems. Processing subsystem 100 may include a memory map used to determine which addresses are mapped to its memory. In one embodiment, the coherency point for an address within processing subsystem 100 is the memory controller 120 coupled to the memory storing bytes corresponding to the address. Memory controller 120 may comprise control circuitry for interfacing to memory. Additionally, memory controllers 120 may include request queues for queuing memory requests.

Outside memory may store instructions of a software application. If the dynamic behavior of this software application is known, improvements may be made to the application to increase performance. For purposes of discussion, a basic block may be defined as a straight-line sequence instructions within a program, whose head, or first instruction, is jumped to from another line of code, and which ends in an unconditional control flow transfer such as a jump, call, or return. A path within the application may be defined as a sequence of unique basic blocks (Bbs) such that the next executed Bb may result in a cycle, wherein a match of a previously processed Bb in the construction of the current path completes the cycle. A sequence of basic blocks (Bbs) may be shown as $Bb_0$, $Bb_1$, $Bb_2$, $Bb_1$. Alternatively, for visual ease of the representation, the first basic block in the sequence may be represented as "A", wherein $Bb_0$=A. The same is true for subsequent basic blocks: $Bb_1$=B, $Bb_2$=C, and so forth. Therefore, the example sequence may be shown as A B C B.

If a sequence of basic blocks is "A B C D B . . . " then the first path constructed may be "A B C D", and the second path constructed may start with the second "B". In addition, a cost, or a weight, may be associated with each Bb, such as the total number of instructions within the Bb, the number of a certain type of instruction within the Bb, or other. During program profiling, this weight may be summed or averaged over all the instructions within the basic block to generate a "heat" value for a path. The "heat" of the path may be multiplied by the frequency of the path during dynamic execution, wherein the frequency may be measured by use-counters. This generated "hot" information allows investigation into the program behavior such as program phase changes. Program phase changes may find a "hot" spot at a time t0 during execution, but this "hot" spot may not exist at time t1, t2, or other. Also, such hot path program profiling may be useful in determining library interactions and information on dynamic instruction mix such as the number of instructions of a certain type, whether the application is instruction fetch bound, or other.

One or more processing units 115a-115b may include the circuitry for executing instructions of the application. As used herein, elements referred to by a reference numeral followed by a letter may be collectively referred to by the numeral alone. For example, processing units 115a-115b may be collectively referred to as processing units 115. Within processing units 115, processor cores 112 include circuitry for executing instructions according to a predefined general-purpose instruction set. For example, the x86 instruction set architecture may be selected. Alternatively, the Alpha, PowerPC, or any other general-purpose instruction set architecture may be selected. Generally, processor core 112 accesses the cache memory subsystems 114, respectively, for data and instructions.

Cache subsystems 114 and 118 may comprise high speed cache memories configured to store blocks of data. Cache memory subsystems 114 may be integrated within respective processor cores 112. Alternatively, cache memory subsystems 114 may be coupled to processor cores 114 in a backside cache configuration or an inline configuration, as desired. Still further, cache memory subsystems 114 may be implemented as a hierarchy of caches. Caches which are nearer processor cores 112 (within the hierarchy) may be integrated into processor cores 112, if desired. In one embodiment, cache memory subsystems 114 each represent L2 cache structures, and shared cache subsystem 118 represents an L3 cache structure.

Both the cache memory subsystem 114 and the shared cache memory subsystem 118 may include a cache memory coupled to a corresponding cache controller. If the requested block is not found in cache memory subsystem 114 or in shared cache memory subsystem 118, then a read request may be generated and transmitted to the memory controller within the node to which the missing block is mapped.

Generally, packet processing logic 116 is configured to respond to control packets received on the links to which processing subsystem 100 is coupled, to generate control packets in response to processor cores 112 and/or cache memory subsystems 114, and to generate probe commands and response packets in response to transactions selected by memory controller 120 for service. Interface logic 130 may include logic to receive packets and synchronize the packets to an internal clock used by packet processing logic 116.

Additionally, processing subsystem 100 may include interface logic 130 used to communicate with other subsystems. Processing subsystem 100 may be coupled to communicate with an input/output (I/O) device (not shown) via interface logic 130. Such an I/O device may be further coupled to a second I/O device. Alternatively, a processing subsystem 100 may communicate with an I/O bridge, which is coupled to an I/O bus.

Figure 2:
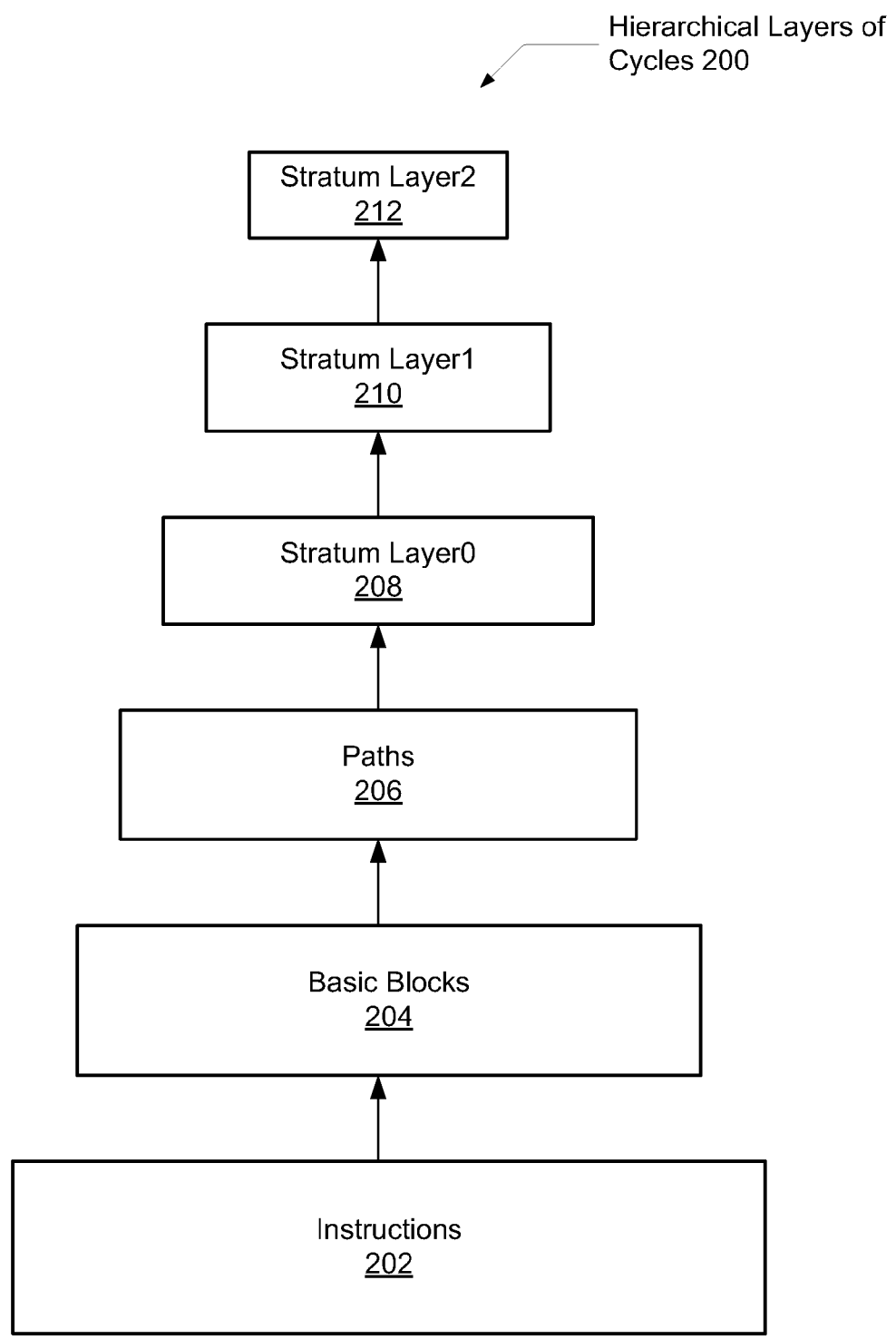
FIG. 2 is a generalized block diagram illustrating one embodiment of hierarchical layers of cycles within a software application.

Referring to FIG. 2, one embodiment of hierarchical layers 200 of cycles within an application is shown. Such layers may be of interest regarding capturing the dynamic behavior of an executing application within a whole program profile. An executing application may have time varying behavior. Within a sequence of two or more predetermined time intervals, an application may exhibit a difference in a number of memory accesses performed, a number of instructions executed, or other. The difference may, for example, be due to the application executing code in a different library or due to executing code in different routines of a same library.

A program profile may include program phase changes. However, phases may not be well defined, and may be determined by the user for a particular improvement being studied. As one example, a conditional branch counter may be used to detect program phase changes. The counter may record the number of dynamic conditional branches executed over a fixed execution interval, which may be measured in terms of the dynamic instruction count. Phase changes may be detected when the difference in branch counts of consecutive intervals exceeds a predetermined threshold.

Another example of a program phase may be the instruction working set of the program, or the set of instructions touched in a fixed interval of time. The use of subroutines may be used to identify program phases. A hardware based call stack may identify program subroutines. The call stack tracks time spent in each subroutine, taking into consideration nesting of subroutines. If the time spent in a subroutine is greater than a predetermined threshold, then a phase change has been identified. The execution frequencies of basic blocks within a particular execution interval may define another phase change.

The instructions 202 of an application may be grouped into basic blocks 204, wherein basic blocks 204 may consist of one or more code statements terminated by an unconditional jump instruction. A particular basic block 204 may be identified by the address of its corresponding first instruction. As described earlier, a path 206 within the application may be defined as a sequence of unique basic blocks (Bbs) such that the next executed Bb may result in a cycle, wherein a match of the current Bb compared to a previously processed Bb in the construction of the current path completes the cycle. Table 1 displays an example of a sequence of Bbs and one embodiment of the resulting paths 206. The initial three Bbs (e.g. A B C) are defined as the first path, Path 0. The fourth Bb (e.g. the second B) is defined as the second path, Path 1, and so forth.

TABLE 1

| Construction of Initial Layers of Cycles | |
|---|---|
| Sequence of Bbs | A B C B B C B |
| Path 0 | A B C |
| Path 1 | B |
| Path 2 | B C |
| Path 3 | B |

A repeated path (RP) is the set of consecutive occurrences of a particular path. For example, if a path 4, or $P_4$, which is not shown above, consecutively repeats 3 times, then its corresponding repeated path may be defined as $P_4^3$. A stratum may be defined as a cycle of repeated paths, or a sequence of repeated paths (RPs) such that the next executed RP will result in a cycle. Basically, the above definition for a path may have RP substituted for Bb in order to define a stratum (S). For example, if a sequence of RPs is $P_0^7, P_1^{12}, P_0^5, P_1^{12}$, then the corresponding strata may be $S_0 = P_0^7, P_1^{12}, P_0^5$ and $S_1 = P_1^{12}$.

A Repeated Stratum 0 ($RS_0$) is the set of consecutive occurrences of a particular Stratum 0 ($S_0$). A stratum layer 0 ($SL_0$) 208 may be defined as a cycle of repeated stratum. Analysis beyond stratum layer 0 may become highly computation intensive. However, further stratum layer 1, stratum layer 2, and so forth, are possible to compute if desired.

In order to detect or identify basic blocks in order to track a sequence of basic blocks (e.g. A B C B B) during execution of a software application, the application program may be instrumented. Program instrumentation may comprise augmenting code with new code in order to collect runtime information. Generally speaking, to instrument code refers to the act of adding extra code to a program for the purpose of dynamic analysis. Also, the code added during instrumentation is referred to as the instrumentation code. It may also be referred to as analysis code. The code that performs the instrumentation is not referred to as instrumentation code. Rather, this code resides in an instrumentation toolkit, which is further explained shortly. In one embodiment, the analysis code may be inserted entirely inline. In another embodiment, the analysis code may include external routines called from the inline analysis code. The analysis code is executed as part of the program's normal execution. However, the analysis code does not change the results of the program's execution, although the analysis code may increase the required execution time.

The instrumentation of code is used during dynamic analysis, which comprises analyzing a client's program, or software application, as it executes. In contrast, static analysis comprises analyzing a program's source code or machine code without executing the code. A compiler is one example of a tool that comprises stages or function blocks that perform static analysis for type checking, identifying "for" and "while" loop constructs for an optimization stage, or other. Although, a compiler may have dynamic stages or function blocks for dynamic compilation such as a Just-In-Time (JIT) compiler. Static analysis only needs to read a program in order to analyze it. The instrumentation of code is not utilized during static analysis. Therefore, the following discussion focuses on dynamic analysis, and static analysis is not considered any further beyond certain front-end and back-end compiler stages.

Also, the instrumentation of code is used during binary analysis, which comprises analyzing programs at the level of machine code, stored either as object code prior to a linking stage of a compiler or as executable code subsequent the linking stage of the compiler. Binary analysis also, regarding dynamic JIT compiling, includes analyses performed at the level of executable intermediate representations, such as byte-codes, which run on a virtual machine. In contrast, source analysis comprises analyzing programs at the level of source code. A compiler, again, is an example of a tool that performs source analysis such as front-end stages of compilation. Although, a compiler also performs binary analysis in later stages of compilation. Source analysis is platform-independent, such as the architecture and the operating system (OS) of the system, but it is language-specific. Binary analysis is language-independent but platform-specific.

An advantage of binary analysis over source analysis is that the original source code is not required. Therefore, library code, which the source code is often not available on systems, is also not required. In one embodiment, performing dynamic analysis and instrumentation on source code may be performed. In a preferred embodiment, binary analysis, or specifically, dynamic binary analysis is performed. In one embodiment, dynamic analysis and instrumentation is performed on an intermediate representation (IR), or bytecode. In a preferred embodiment, dynamic binary analysis, comprising instrumentation, is performed on machine code.

The binary instrumentation of code may be performed statically or dynamically. Static binary instrumentation (SBI) occurs prior to the execution of a program. The process of SBI rewrites object code or executable code. SBI may comprise receiving the executable binary code as an input, adding the instrumentation code and analysis code to the binary code at desired locations, and generate new machine code with instrumentation code to be loaded and executed. Examples of static instrumentation toolkits include ATOM and Vulcan.

Dynamic binary instrumentation (DBI) occurs at run-time. Dynamic binary instrumentation may comprise modifying the original executable machine code with instrumentation code and analysis code as the original machine code is executing. This additional code can be injected by a program grafted onto the client process, or by an external process. If the software application comprises dynamically-linked code, then the analysis code needs to be added subsequent the processing of the dynamic linker.

Figure 3:
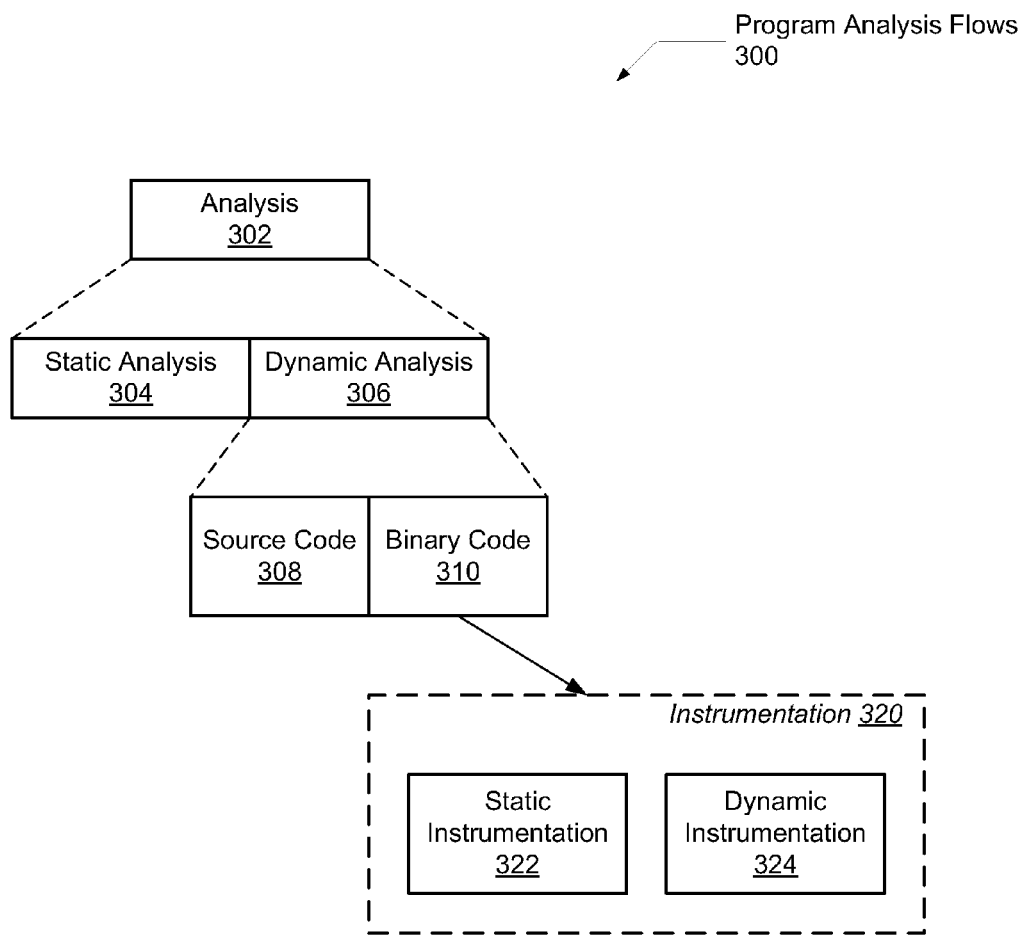
FIG. 3 is a generalized block diagram of one embodiment of program analysis flows.

In one embodiment, the binary instrumentation of machine code is static (SBI). In a preferred embodiment, the binary instrumentation of executable binary code is dynamic (DBI). Turning now to FIG. 3, one embodiment of program analysis flows 300 is shown. As discussed earlier, analysis 302 of a software application may be static 304, or does not require execution of the application. Alternatively, analysis 302 may be dynamic 306, or does require execution of the application. In one embodiment, dynamic analysis 306 may be performed on source code 308. Such an analysis may require instrumentation of the source code 308 itself followed by compilation of the resulting code. The subsequent compilation may be static or dynamic. These steps are possible to implement, but not shown. Maintaining analysis of source code 308 may not be desirable due to a lack of library support and other reasons. A preferred embodiment of an analysis flow 300 is dynamic analysis 306 on binary code 310, such as machine code. It is noted that binary code 310 has already been compiled either statically or dynamically. Later partial (re)compiles of the binary code 310 correspond with instrumentation 320.

Binary code 310 may be augmented by instrumentation 320, which, in one embodiment, may be static 322, or prior to run-time of the executable code. Such a flow may require static compilation, wherein instrumentation libraries or tools insert analysis code. This insertion step may occur prior to linking or subsequent to linking within the back-end compilation stage. The new, augmented code is then ready to be executed and provide statistics for performance studies or debugging techniques.

In a preferred embodiment, binary code 310 may be augmented by dynamic instrumentation 324, which occurs at run-time. In one embodiment, a dynamic binary instrumentation (DBI) tool grafts itself into the client process at startup, and then partially (re)compiles the binary code of the software application, one basic block at a time, in a just-in-time (JIT), execution manner. This (re)compilation process may comprise disassembling the machine code into an intermediate representation (IR) which is instrumented by a tool plug-in.

The user writes instrumentation and analysis routines, which may interface with an application programming interface (API) of the DBI tool. The instrumentation is customizable. The user decides where analysis calls are inserted, the arguments to the analysis routines, and what the analysis routines measure. The instrumented IR may then be converted back into binary code, which is referred to as a translation. This translation may be stored in a code cache to be executed as necessary. The processor core(s) spends its execution time generating, locating, and executing translations.

For example, an instrumentation toolkit may be instructed to insert code at basic block boundaries within the application program. In one embodiment, the following information may be collected from the application by the instrumentation code at the basic block boundaries: basic block address, "heat" of the basic block, and basic block disassembly. The "heat" of the basic block may be a measure of how much time a particular basic block requires to execute. In one embodiment, the "heat" may simply be the number of instructions in the basic block. In other embodiments, the "heat" may be measure of a number of a certain type of instruction within the corresponding basic block, a total number of clock cycles required for an execution of the basic block, a total number of cache misses, or other.

Information regarding instruction types may be derived from the basic block disassembly also. The basic block disassembly is machine code presented in a human-readable formal language format, such as the assembly language of the target platform. The disassembly may be presented in hex bytes. Typically, basic block disassembly is used with debugging tools. Also, since assembling to machine code, which may occur during back-end compilation, removes all traces of labels from the code, the object file format has to keep these values stored in different places. A symbol table may be used for this purpose. The symbol table may contain a list of label names and their corresponding offsets in the text and data segments. A disassembler provides support for translating back from an object file or an executable file.

Dynamic compilation and caching, such as with a code cache, is an alternative to interpreted execution with a different trade-offs. By taking the extra space to store the (re)compiled code, repeating operations such as instruction decoding are avoided. Also, by translating entire basic blocks, performance may be further improved with intra-basic-block optimizations.

The DBI tool sees every instruction in the user process that is executed, including the dynamic loader and all shared libraries. The instrumentation and analysis execute in the same address space as the application, and can see all the application's data. The DBI tool passes instructions or a sequence of instructions (trace) to an instrumentation routine. It does not use the same memory stack or heap area as the application, and maps addresses in a special area. Addresses of local variables (stack) and addresses returned by calls are not changed. Other embodiments of a DBI tool are possible and contemplated.

Figure 4:
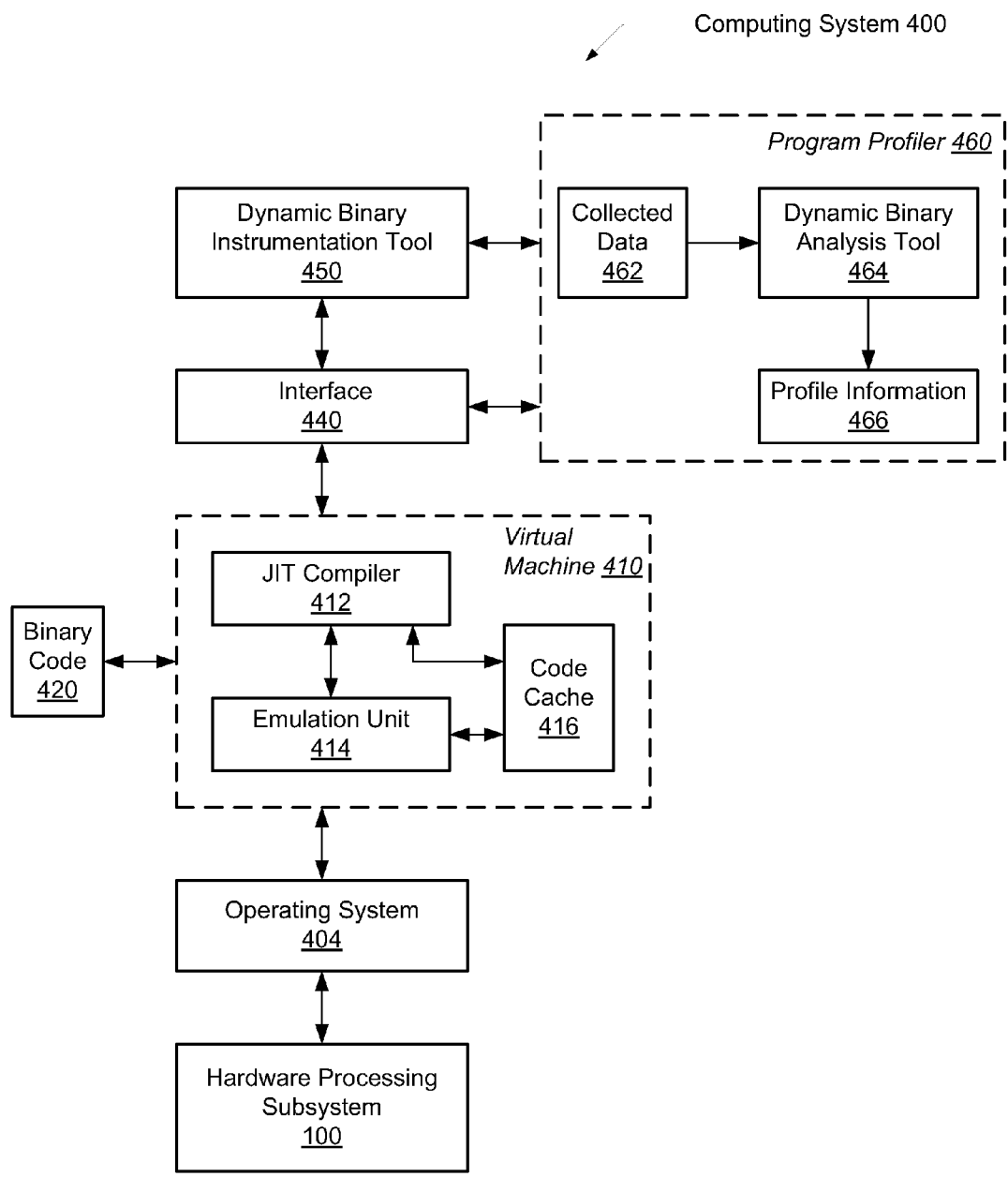
FIG. 4 is a generalized block diagram of one embodiment of a computing system.

Turning now to FIG. 4, one embodiment of a computing system 400 for whole program profiling is shown. In one embodiment, hardware processing subsystem 100 has the same circuitry as shown in FIG. 1. Operating system 404 manages the operation of the hardware in subsystem 100, which relieves application programs from having to manage details such as allocating regions of memory for a software application. The multiple processes of a compiled software application may require its own resources such as an image of memory, or an instance of instructions and data before application execution. Each process may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

Virtual machine 410 executes programs as if it is the hardware platform. Virtual machine 410 may execute programs that were written for the computer processor architecture within subsystem 100, which may be referred to as native execution. Virtual machine emulates the hardware of subsystem 100. Alternatively, virtual machine 410 may execute programs that were written for another computer processor architecture outside of subsystem 100. In this case, virtual machine 410 emulates the hardware of an outside processor architecture with the aid of emulation unit 414. Dynamic binary translation performed by virtual machine 410 permits this interesting feature that executing binary code 420 may be separated from the underlying hardware in subsystem 100.

Virtual machine 410 may support dynamic compilation, such as Just-In-Time (JIT) compilation with JIT compiler 412. Binary code 420 may be an application that has already been compiled and currently resides in system memory or the cache memory subsystem of hardware processing subsystem 100. Dynamic compilation performed by JIT compiler 412 within virtual machine 410 may also perform dynamic binary translation, which allows a software application of an arbitrary guest architecture to be executed on a computing system 400 with a different host architecture within subsystem 100. Therefore, the software and hardware may evolve independently. The dynamically translation output of binary code 420 is stored in code cache 416 for execution. The performance improvement over interpreters originates from caching the results of translated blocks, such as basic blocks, of binary code 420 into code cache 416. Now each line or operand is not reevaluated each time it is encountered. It also has advantages over statically compiling the code at development time, as it can partially recompile the binary code 420 if this is found to be advantageous, and may be able to enforce security guarantees.

Interface 440 may comprise application programming interfaces (APIs) for dynamic binary instrumentation (DBI) tool 450. Interface 440 may allow a user to determine what instrumentation routines and analysis routines may be augmented to binary code 420 by DBI tool 450. Generally speaking, APIs are architecture independent. The APIs may be call-based and provide functionalities to determine control flow changes, memory accesses, or other. Instrumentation routines define where instrumentation code is inserted such as before an instruction and they occur the first time an instruction is executed. Analysis routines define the functionality of the instrumentation when the instrumentation is activated. An example is an increment counter. These routines occur each time an instruction is executed.

In a preferred embodiment, the DBI tool 450 is dynamic. The DBI tool 450 may modify the binary code 420 with instrumentation and analysis code as the binary Is code 420 is executing. As the binary code 420 is being augmented and executed, the DBI tool 450 may convey characteristic information to the program profiler 460 to be stored in collected data 462. The characterization information may comprise for each basic block at least one or more of the address of the first instruction, the "heat" value of the basic block, and the disassembly of each instruction of the basic block.

The dynamic binary analysis (DBA) tool 464 may read the contents of collected data 462 in order to identify a path. As described earlier, and shown in Table 1, a path within the binary code 420 may be defined as a sequence of unique basic blocks (Bbs) such that the next executed Bb may result in a cycle, wherein a match of a previously processed Bb in the construction of the current path completes the cycle. The DBA tool 464 may be used to collect the complete dynamic instruction stream of an arbitrary thread of an application for a given dataset, in an efficient, compact fashion. In one embodiment, it may not attempt to account for interactions between threads. It may only function on single-threaded applications.

In one embodiment, the dynamic binary analysis (DBA) tool 464 may compress the accumulative characterization information and corresponding identification information of a path prior to storing this complete path information. In one embodiment, the path information may be compressed using a context-free grammar, such as algorithmic compression on the set of executed paths. The compressed version of the set of paths may be stored in a hash table. The compressed set of paths may then be analyzed to find "hot" paths simply by performing sorting on the set of paths for the "hot" values without any further post-processing of the compressed output. Recall, the "hot" values may be derived from the "heat" values of basic blocks as described earlier.

Next, the DBA tool 464 may analyze the compressed set of paths simultaneously as the binary code 420 is being translated, instrumented, and executed in order to identify repeated paths. The repeated paths may be used to later identify strata, repeated stratum, and a stratum layer as described earlier regarding the hierarchical layers of cycles in FIG. 2. In one embodiment, compression may occur prior to storage of strata, repeated strata, and the stratum layer. In one embodiment, each of the repeated paths is given a unique "strata" identifier. An identified sequence of repeated strata may then be compressed and stored to an indexed sequential access method (ISAM) file. Each record of information in the ISAM file may be accessed by an ending instruction number, ending path number, an ending strata number, or other. Profile information 466, such as he combination of the stored data in hash tables and the ISAM file, provides a whole program profile that may be used to characterize the dynamic behavior of binary code 420 such as program phase changes and other.

Figure 5:
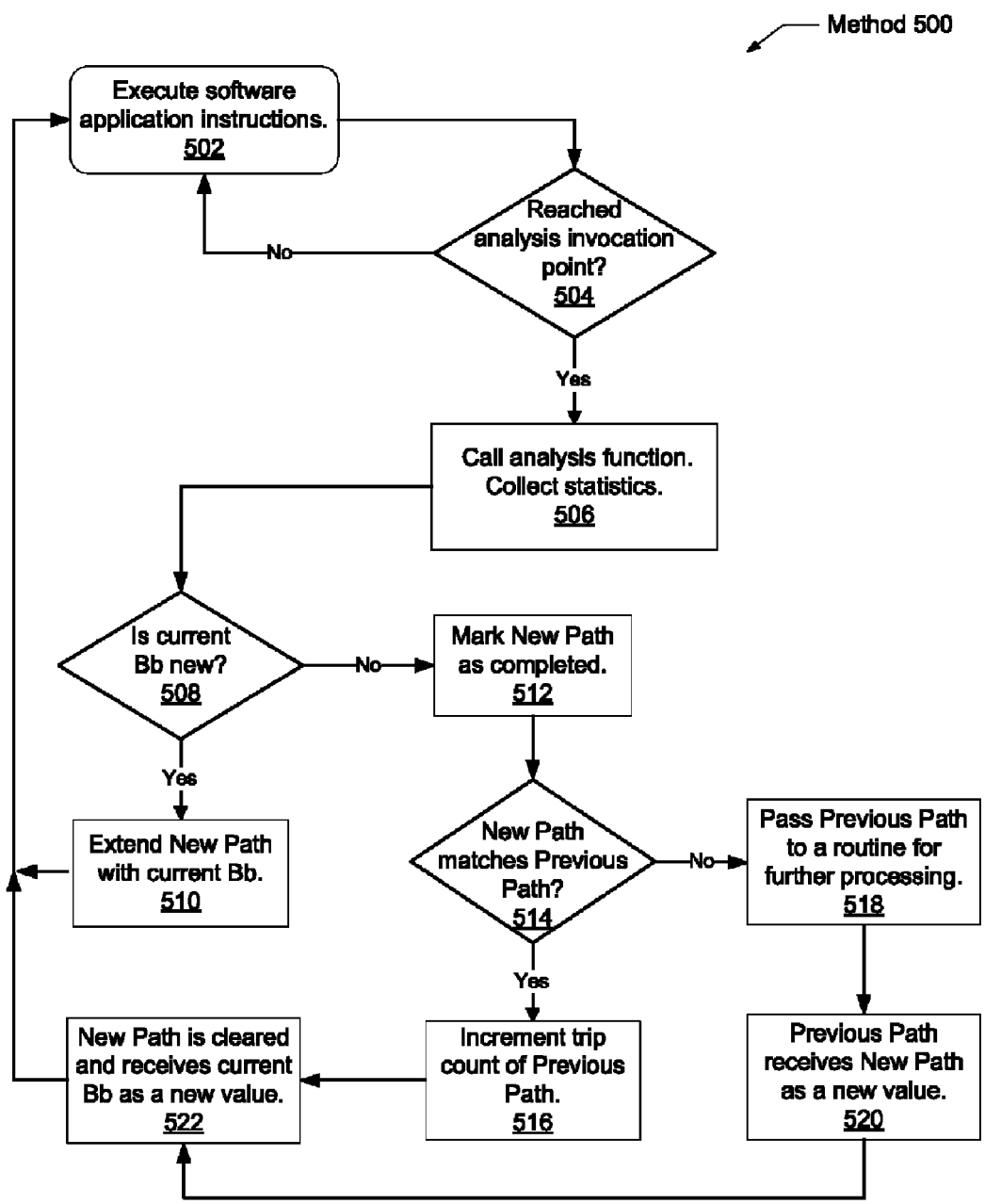
FIG. 5 is a flow diagram of one embodiment of a method for identifying paths and repeated paths within the dynamic behavior of a software application.

Turning now to FIG. 5, one embodiment of a method 500 for identifying paths and repeated paths within the dynamic behavior of binary code is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 502, instructions of binary code, such as machine code, of a software application may be loaded, translated, instrumented, and executed. In one embodiment, the instrumentation code and analysis code may be augmented to the translated binary code according to directives given by a user via a dynamic binary instrumentation (DBI) tool. In one embodiment, each time a basic block boundary, such as the head or the end, is encountered (conditional block 504), an analysis function call may be invoked and characterization information of the basic block may be compressed and stored, or simply stored, in block 506. Storage may utilize a hash table. The characterization information corresponding to the current basic block may include one or more of the following: an address of the first instruction of the basic block, the weight or "heat" value, disassembly of the instructions, or other. In another embodiment, the DBI tool may utilize a more efficient location in the code to invoke an analysis function call other than a basic block boundary. For example, another location within the basic block other than the start or finish may require less context, or data corresponding to system registers, virtual addresses, or other information pertaining to the execution of a particular thread or process, to be saved due to the instruction sequence. For purposes of a profiler, the actual location where the analysis function call is invoked is not critical as long as the relevant content is tracked.

If the current identified basic block (Bb) is new (conditional block 508), or it does not match a previously processed Bb in the construction of a sequence of unique Bbs, or current path, then the current path is extended with the current Bb and control flow of method 500 returns to block 502. Otherwise, if the current identified Bb is not new (conditional block 508), then the current path, or New Path, is marked as completed in block 512.

A comparison is performed between the stored values the New Path and a Previous Path (conditional block 514). This comparison may include a comparison of unique identifiers assigned to each path, a comparison of predetermined fields of each path, or other. If the New Path matches the Previous Path (conditional block 514), then a trip count of the Previous Path is incremented in block 516. A pointer, identifier, storage element, or other corresponding to Previous Path continues to correspond to the current value of the Previous Path, but with an incremented trip count. In block 522, the pointer, identifier, storage element, or other corresponding to New Path does not continue to correspond to the current value of New Path. Rather the value of New Path is cleared and subsequently extended with the value of the current Bb.

For example, if a sequence of Bbs is "A B C A B C B" and method 500 is currently processing the third B in the sequence, then the current values of both the Previous Path, which may designated as $P_0$, and New Path, $P_1$, may be "A B C", $P_0=P_1=$A B C. A comparison and subsequent match of $P_0$ and $P_1$ causes the trip count of $P_0$ to increment and Previous Path now may be designated as $P_0^2$. New Path, $P_1$, is cleared and now has the value "B". Control flow of method 500 returns to block 502.

If the New Path does not match the Previous Path (conditional block 514), then the Previous Path is passed to a routine for further processing in block 518. This further processing may be use the value of the Previous Path to identify repeated paths, strata, repeated stratum, and a stratum layer as described earlier regarding FIG. 2. A pointer, identifier, storage element, or other corresponding to Previous Path no longer continues to correspond to the current value of the Previous Path. Rather, the value of the Previous Path is now replaced by the value of the New Path in block 520.

For example, if a sequence of Bbs is "A B C A B D A" and method 500 is currently processing the third A in the sequence, then the current values of both the Previous Path, which may designated as $P_0$, and New Path, $P_1$, may be "A B C" and "A B D" respectively; $P_0=$A B C, and $P_1=$A B D. A comparison and subsequent mismatch of $P_0$ and $P_1$ causes the value of $P_0$, "A B C" and its corresponding trip count to be passed along for further processing and the new value of the Previous Path is now the current value of the New Path, or now $P_0=$A B D. Next the value of the New Path is cleared or reset and replaced with the value of the current Bb, or now $P_1=$A. Control flow of method 500 moves to block 522.

Figure 6:
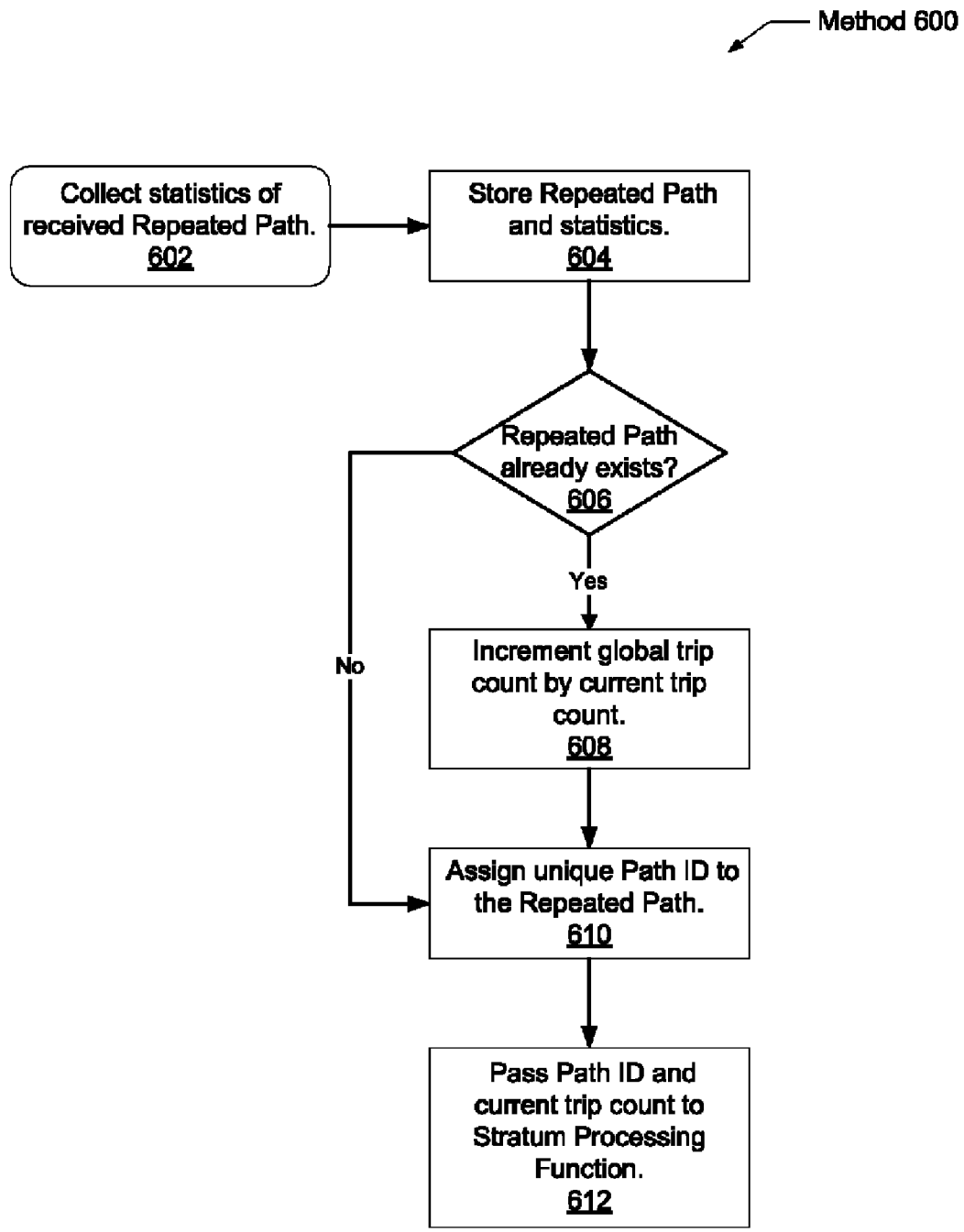
FIG. 6 is a flow diagram of one embodiment of a method for processing a repeated path prior to stratum processing.

Referring now to FIG. 6, one embodiment of a method 600 for processing a repeated path prior to stratum processing is shown. As with method 500 and other methods described herein, the steps in this embodiment and subsequent embodiments of methods described later are shown in sequential order. However, some steps may occur in a different order than shown, some steps may be performed concurrently, some steps may be combined with other steps, and some steps may be absent in another embodiment.

Method 600 may correspond to processing steps subsequent to block 518 of method 500. Predetermined statistics of the received repeated path are collected in block 602. These statistics and information corresponding to the sequence of Bbs within the path are stored in block 604. In one embodiment, the statistics and information are compressed prior to being stored in a hash table. If this particular repeated path has been processed earlier in dynamic program execution (conditional block 606), then a corresponding global trip count is incremented by the current trip count of the repeated path in block 608.

Whether or not this repeated path has been processed earlier, a unique path identifier (ID) is assigned to this repeated path in block 610. The path ID and current trip count of the repeated path are then passed to a stratum processing function in block 612.

Figure 7:
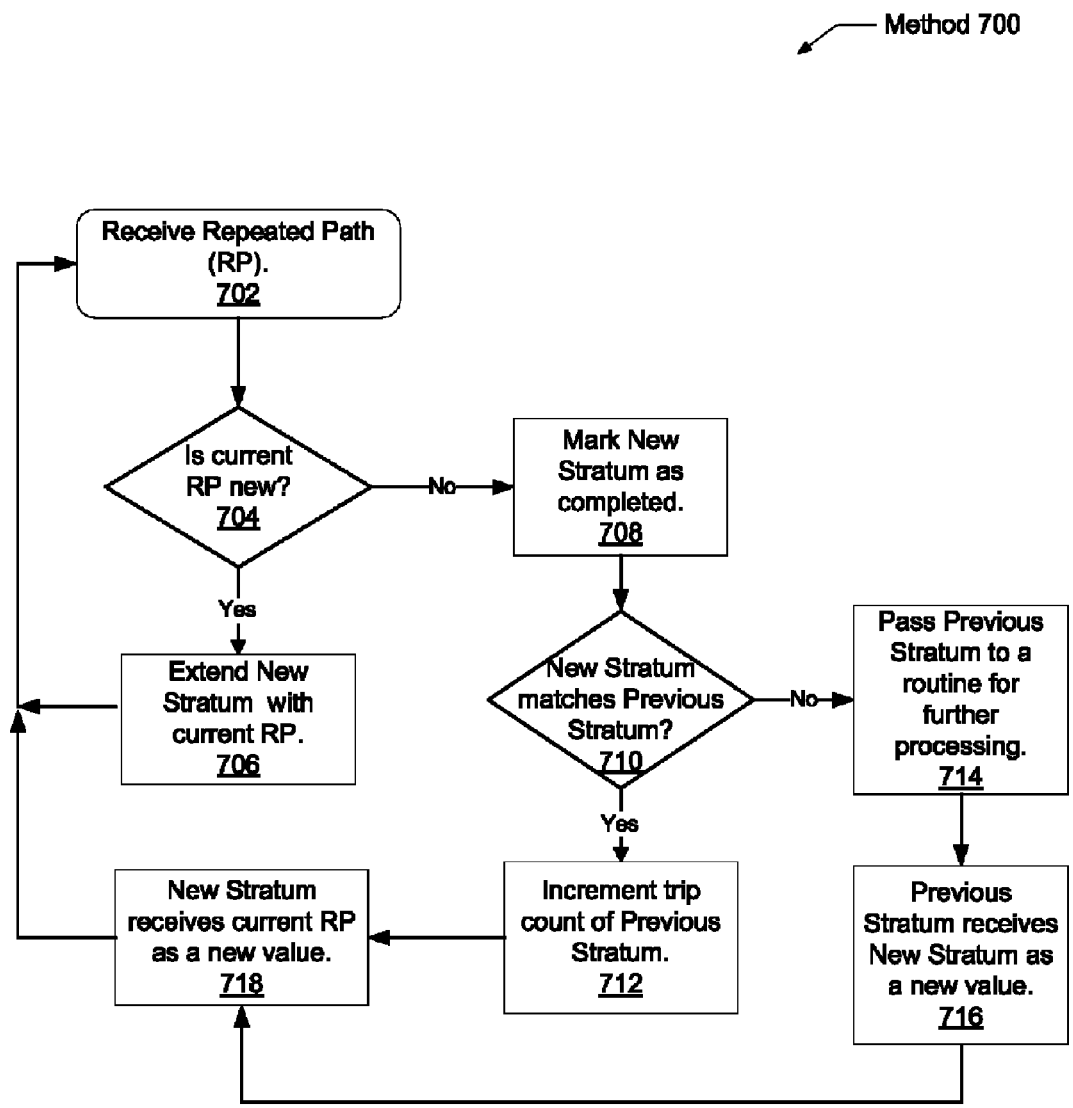
FIG. 7 is a flow diagram of one embodiment of a method for identifying stratum and repeated strata within the dynamic behavior of a software application.

Turning now to FIG. 7, one embodiment of a method 700 for identifying stratum and repeated strata within the dynamic behavior of binary code is shown. In one embodiment, method 700 parallels method 500, wherein a basic block is replaced by a repeated path and a path is replaced by a stratum.

In block 702, a repeated path that has been passed by method 500, processed, compressed, and stored may be received by method 700. Blocks 704-718 may parallel blocks 508-522 of method 500. Blocks 704-718 may have the same functionality as blocks 508-522, except a sequence of repeated paths corresponding to dynamic behavior or a binary code execution are used to identify strata and repeated strata versus basic blocks are used to identify paths and repeated paths.

For example, if a sequence of repeated paths (RPs) is "$P_0^7$, $P_1^{12}$, $P_0^5$, $P_0^7$, $P_1^{12}$, $P_0^5$, $P_1^{12}$" and method 700 is currently processing the third RP, $P_1^{12}$, in the sequence, then the current values of both the Previous Stratum, which may designated as $S_0$, and New Stratum, $S_1$, may be "$P_0^7$, $P_1^{12}$, $P_0^5$", or $S_0=S_1=$"$P_0^7$, $P_1^{12}$, $P_0^5$". A comparison and subsequent match of $S_0$ and $S_1$ causes the trip count of $S_0$ to increment and Previous Stratum now may be designated as $S_0^2$. New Stratum, $S_1$, is cleared and now has the value "$P_1^{12}$".

In another example, if a sequence of RPs is "$P_0^7$, $P_1^{12}$, $P_0^5$, $P_0^7$, $P_1^{12}$, $P_2^4$, $P_0^7$" and method 700 is currently processing the third $P_0^7$ in the sequence, then the current values of both the Previous Stratum, which may designated as $S_0$, and New Stratum, $S_1$, may be "$P_0^7$, $P_1^{12}$, $P_0^5$" and "$P_0^7$, $P_1^{12}$, $P_2^4$" respectively. A comparison and subsequent mismatch of $S_0$ and $S_1$ causes the value of $S_0$ and its corresponding trip count to be passed along for further processing in block 714. The new value of the Previous Stratum is now the current value of the New Stratum, or now $S_0 = "P_0^7, P_1^{12}, P_2^4"$. Next the value of the New Stratum is cleared or reset and replaced with the value of the current RP, or now $S_1 = P_0^7$.

Figure 8:
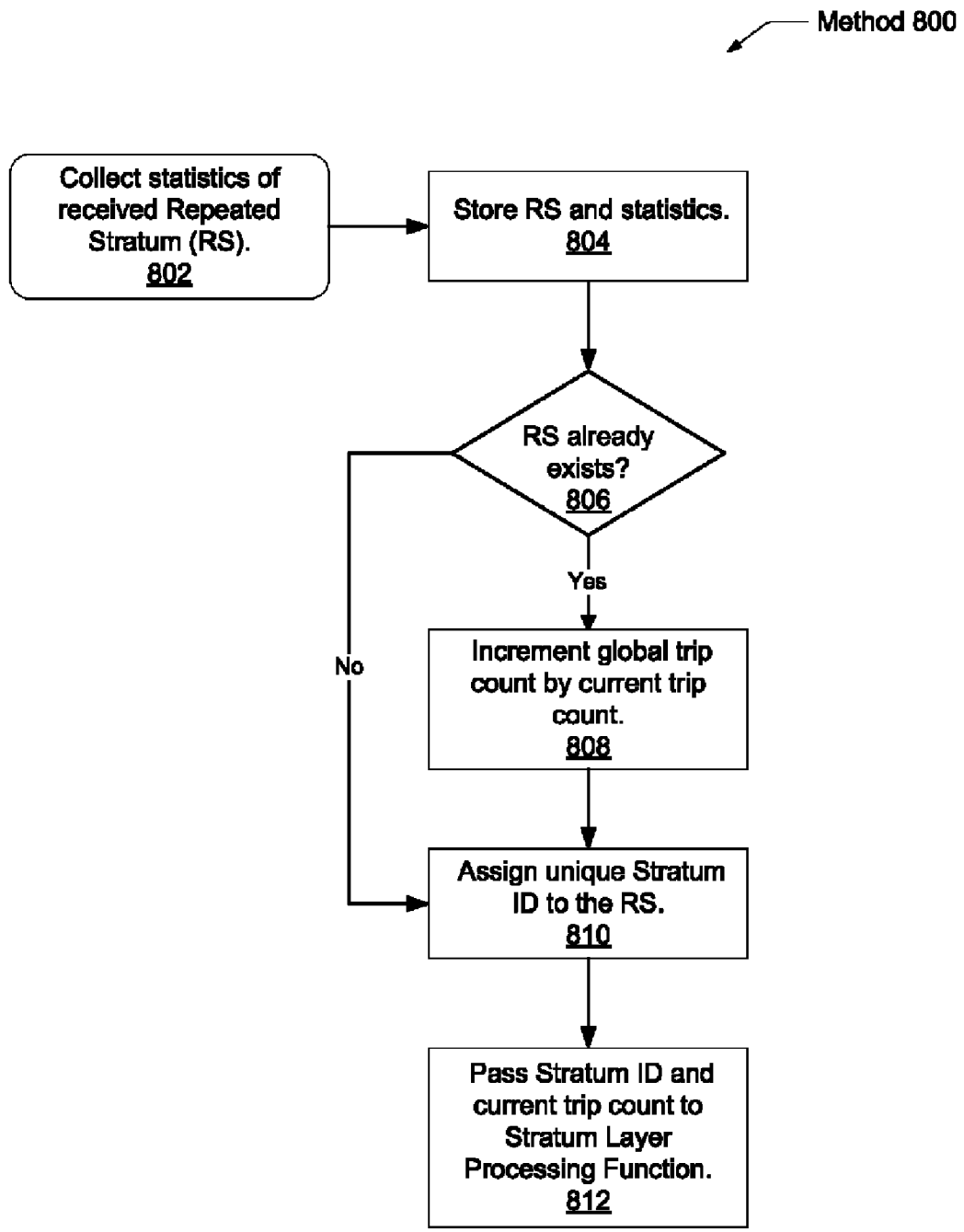
FIG. 8 is a flow diagram of one embodiment of a method processing a repeated stratum prior to stratum layer processing.

Referring now to FIG. 8, one embodiment of a method 800 for processing a repeated stratum prior to stratum layer processing is shown. In one embodiment, method 800 parallels method 600, wherein a repeated path is replaced by a repeated stratum and a stratum is replaced by a stratum layer. Method 800 may correspond to processing steps subsequent to block 714 of method 700. Predetermined statistics of the received repeated stratum are collected in block 802. These statistics and information corresponding to the sequence of repeated paths within the stratum are stored in block 804. In one embodiment, the statistics and information are compressed prior to being stored in a hash table. Blocks 806-812 may have the same functionality as blocks 606-612, except a sequence of repeated paths corresponding to dynamic behavior or a binary code execution are used to identify strata and repeated strata versus basic blocks are used to identify paths and repeated paths. The functionality of methods 700 and 800 may be repeated in further methods, wherein a sequence of repeated strata corresponding to dynamic behavior of a binary code execution are used to identify a stratum layer versus repeated paths are used to identify strata and repeated strata.

Analysis beyond a stratum layer$_0$ ($SL_0$) may be highly computationally bound. If the methods become computationally bound, the definition of a stratum may change to only fully track a stratum whose length has 4 or less repeated paths. Similar alterations are possible and contemplated. The functionality of methods 500-800 may be used to continue processing in order to determine a $SL_1$, a $SL_2$, and so forth. Upon completion at the desired layer, the path, stratum, and stratum layer tables may be written to files and these files may be summarized by logfiles. These files and logfiles may provide a whole program profile of a software application that captures the dynamic behavior of the application including program phase changes.

As mentioned earlier, the above methods for dynamically performing whole program profiling may include storing program regions in a hash table, wherein program regions may comprise basic blocks (Bbs), paths, stratum, stratum layer, or other. As is well known in the art a hash table may be used to store data that may be accessed regularly. An example of such data is the program region data to be used to determine dynamic program behavior. A slot, or a bucket, may be deep, or contain a large number of entries. The size of a hash table entry and the chosen hash function may determine the length of a particular slot within the hash table.

A particular program region, such as a path, may be determined to be "hot". As stated earlier, such a determination may be found by multiplying the "heat" value of the path, such as the sum of the total number of instructions within the basic blocks of the path, by the frequency of the path during dynamic execution, wherein the frequency may be measured by trip-counters. When a particular path is "hot", its corresponding data stored in a hash table may be indexed upon every occurrence of this "hot" region. For example, blocks 514-518 of FIG. 5 and blocks 710-714 of FIG. 7, may index a hash table in order to access corresponding data of a program region, such as the Previous Path or the Previous Stratum. Correspondingly, if these program regions are "hot", a large number of accesses to the hash table may be required.

Figure 9:
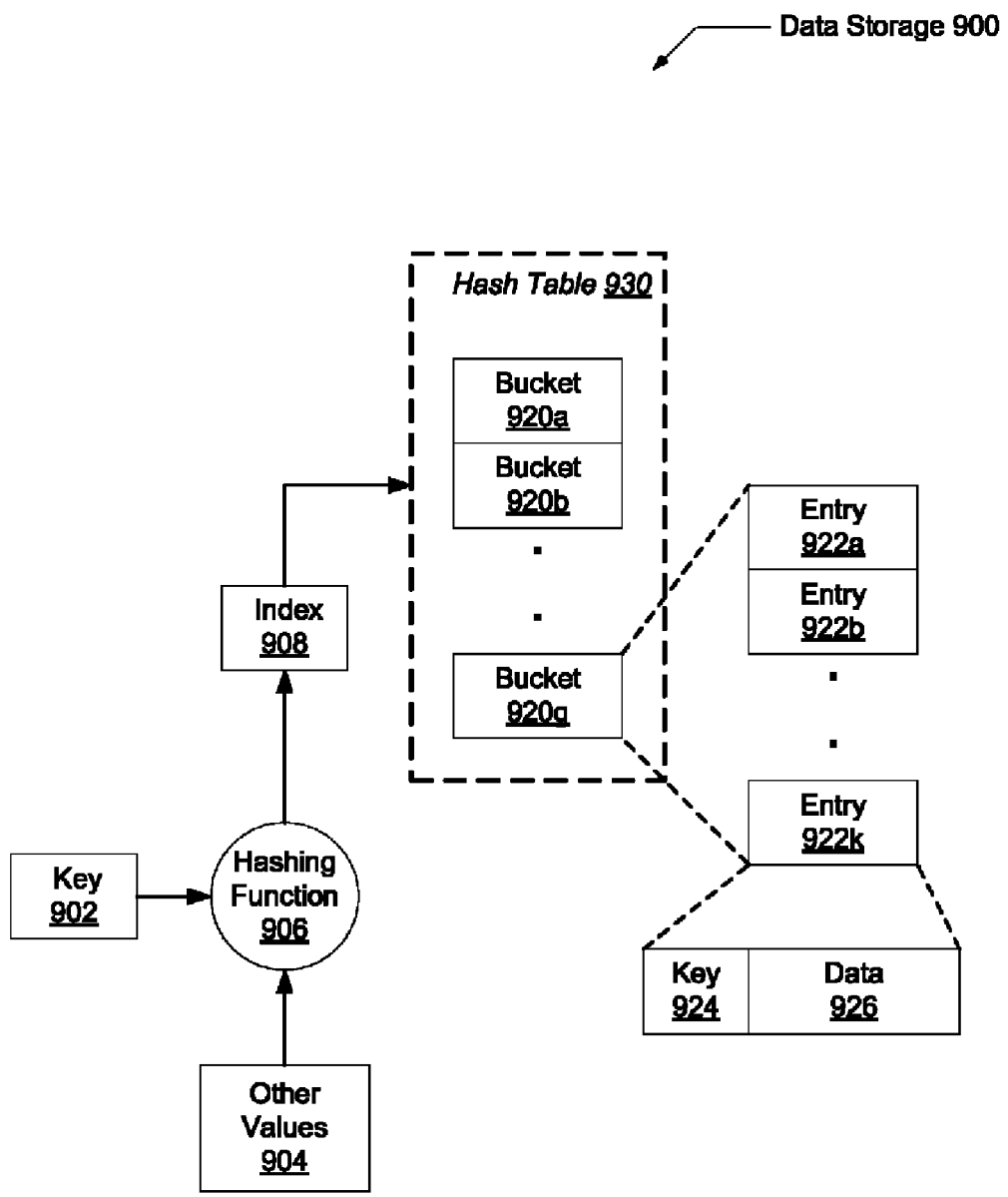
FIG. 9 is a generalized block diagram of one embodiment of data storage.

Turning now to FIG. 9, one embodiment of a generalized block diagram of data storage 900 is shown. Data storage 900 is a data structure that associates key values 902 with data values, such as data 926. 900 may support both efficient lookup of data and efficient insertion of new entries of data. For example, regarding basic blocks, key 902 may be an address of the first instruction of the basic block, key 924 may be the same address value, and data 926 may include the weight value of the basic block used to determine the "heat" of a corresponding path, and disassembly of the instructions of the basic block. In another example, key 902 may be a path ID, key 924 may be the same ID value, and data 926 may include a sequence of basic blocks, a trip counter, a "heat" value, and other corresponding data.

The key value 902 may be combined with other values 904, such as a history, or key value 902 may be the only value used in the hash function 906 or algorithm. Hash function 906 may be used to generate a relatively small integer output, index value 908, from the key value 902. Subsequently, index value 908 may be used to index an array, such as hash table 930. Alternatively, index value 908 may be referred to as a hash value, hash code, hash sum, or simply hash. Index 908 may be used to locate the desired location, or bucket 920, that stores the corresponding data 926. Then, the bucket 920 may have its entries 922 searched for the corresponding key-value pair (924 and 926). A separate index value and a mapping not shown may be used to perform this search. Many different implementations of hash function 906 and hash table 930 are possible, as is well known in the art, and contemplated.

In the context of a program profiler, the number of paths may be large such as upwards of 2 million paths for multiple benchmarks. Therefore, it may be necessary that hash table 930 becomes deep, or has a large number of entries 922 in its buckets 920. A deep hash table may result in performance degrading overhead such as "pointer chasing". Pointer chasing may result from traversing a linked list or a graph structure such as a hash table wherein multiple levels of indirect memory addressing are used. Once this occurs, pointer chasing overhead may become a major factor in the performance degradation of an application such as a whole program profiler.

Further, a higher overhead scheme, such as a self balancing tree attached to the hash buckets may significantly reduce the performance of the entire system. Rather, by periodically sorting some or all parts of the hash table 930 based upon a number of accesses may significantly reduce the pointer chasing overhead. The number of accesses may be equivalent to the "hot" value of a stored program region.

Figure 10:
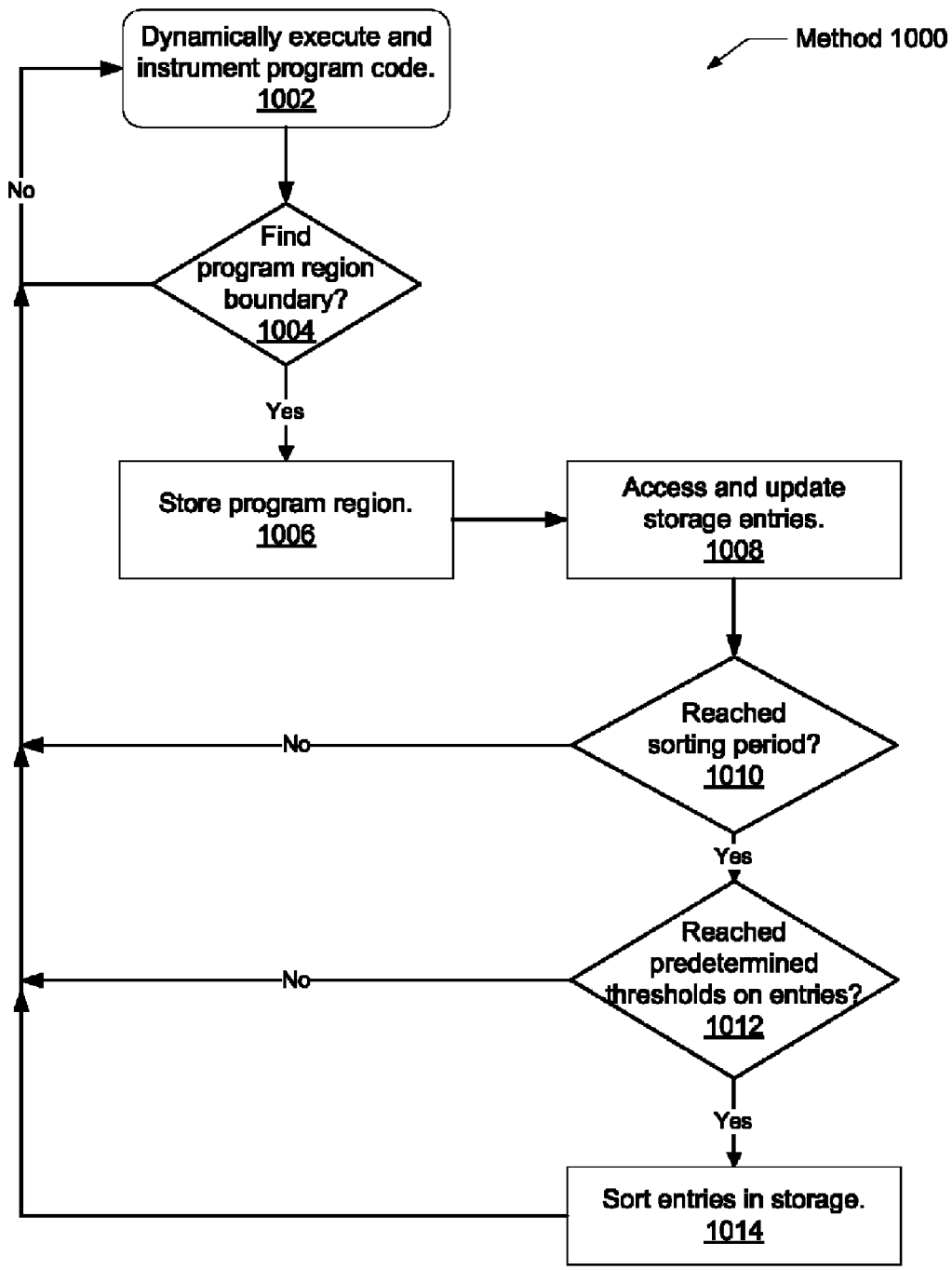
FIG. 10 is a flow diagram of one embodiment of a method bounded hash table sorting during dynamic whole program profiling of software applications.

Turning now to FIG. 10, one embodiment of a method 1000 for bounded hash table sorting during dynamic whole program profiling of software applications is shown. For purposes of discussion, the steps in this embodiment, similar to steps of other methods described herein, are shown in sequential order. However, some steps may occur in a different order than shown, some steps may be performed concurrently, some steps may be combined with other steps, and some steps may be absent in another embodiment.

Dynamic whole program profiling may occur in block 1002 where instructions of a program code are simultaneously executed and instrumented. When a program region boundary is encountered (conditional block 1004), its corresponding data may be compressed and stored, such as in a hash table. Examples of encountering program regions include determining basic blocks, paths, and stratum in blocks 504, 512, and 708 of methods 500 and 700, respectively. The same process may occur for stratum layers. If the program regions repeat later in the dynamic behavior of the application, then corresponding trip counters and possibly global counters may be need to be incremented. Therefore, the storage data structure, such as a hash table, may be accessed and updated in block 1008.

A predetermined sorting periodicity may be reached (conditional block 1010) during program execution and instrumentation. In one embodiment, a predetermined number of clock cycles may be used. In another embodiment, a certain number of instructions fetched or executed may be used. Only portions of a data structure may be sorted, such as certain buckets within a hash table. Predetermined thresholds may determine which entries within the data structure are sorted during a current sort period (conditional block 1012). In one embodiment, the predetermined thresholds may comprise a depth threshold, such as a number of entries within a bucket or slot needs to be exceeded, and a frequency threshold, such as a number of accesses to an entry or a total number of accesses to an entire bucket needs to be exceeded. If these thresholds are not met, then a corresponding bucket may not be sorted. Otherwise, a corresponding bucket or corresponding entries within a bucket are stored in block 1014. Other predetermined thresholds are possible and contemplated.

For example, a particular bucket within a hash table may exceed the predetermined depth threshold. A predetermined frequency threshold may be 100,000 accesses. If the entries within this particular bucket have the following listed frequencies prior to a descending order sort {100E6, 101E6, 9,000; 22; 8,431; 99,997; 32,111; 6,719; 5,234}, then the partial sorted result may be {101E6, 100E6, <rest of list not sorted or touched>}. If only those entries which exceed the frequency threshold are sorted, then the number of required computations may be reduced. Further, relatively small buckets, which do not exceed the depth threshold, may also be optionally ignored. The overhead of a relatively small number of pointer dereferences may be low enough to be less than the sorting overhead, or deemed unimportant.

Figure 11:
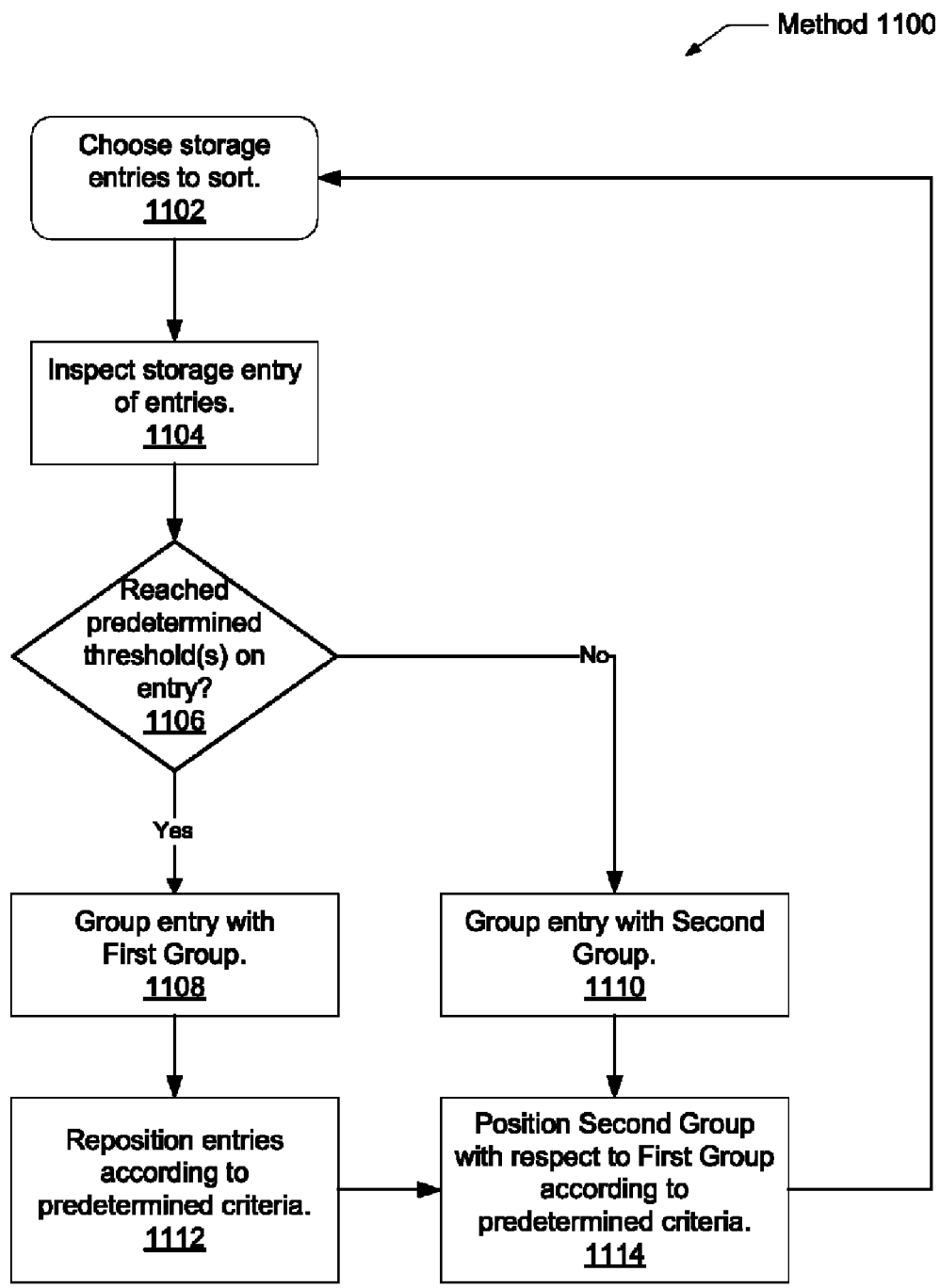
FIG. 11 is a flow diagram of one embodiment of a method for sorting data structure entries.

Referring to FIG. 11, one embodiment of a method 1100 for sorting data structure entries is shown. The entries to sort are chosen in block 1102. In one embodiment, the selection process of blocks 1010 and 1012 may be used wherein a periodicity and predetermined threshold comparisons may need to be satisfied. Buckets chosen to be possibly sorted, which may exceed a depth threshold, and corresponding entries may be inspected in block 1104. If a particular entry reaches or exceeds a predetermined threshold, such as a frequency threshold (conditional block 1106), then this particular entry may be placed in a first group in block 1108. Otherwise, this particular entry may be placed in a second group in block 1110. Again, the steps within blocks 1104-1110 may be implemented in a number of ways and some of the inspection and group placement steps may occur simultaneously, while other steps occur serially.

For the entries in the first group, these entries may be repositioned according to an ascending, descending, or other order in block 1112. In one embodiment, the frequency, or number of accesses, of each entry may be used as the repositioning criteria. Other criteria may be used in other embodiments. The second group may be positioned with respect to the first group according to this same order in block 1114.

An additional benefit of the sorting of a hash table that stores program regions is phase determination. If the entries chosen to be sorted differ between their pre-sorted and post-sorted order within a hash bucket, then it may be an indication that a phase change within the program occurred and has been found. For example, if a value of a trip counter or other measurement register within two sequential entries in a hash chain, or bucket, are determined to be similar, then the entries may be swapped without a change in program phase. However, if the particular register values are determined to be appreciably different, such as an order of magnitude apart, prior to a sort, and now the order of the entries are reversed, then it may be a good indication that a of phase change did occur. A separate check following block 1114 may be utilized for this purpose.

Various embodiments may further include receiving, sending or storing instructions and/or data that implement the above described functionality in accordance with the foregoing description upon a computer readable medium. Generally speaking, a computer readable storage medium may include one or more storage media or memory media such as magnetic or optical media, e.g., disk or CD-ROM, volatile or non-volatile media such as RAM (e.g., SDRAM, DDR SDRAM, RDRAM, SRAM, etc.), ROM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for bounded hash table sorting during dynamic whole program profiling of program code as the program code executes, the method comprising:
   instrumenting program code to identify a sequence of basic blocks in dynamic program order;
   storing characterization information corresponding to program regions of the program code in a hash table, said hash table comprising a plurality of buckets wherein each bucket comprises a plurality of entries; and
   sorting entries of a bucket of the hash table, in response to detecting a timing condition and a table condition are satisfied;
   wherein detecting the timing condition is satisfied comprises determining an entry of the bucket has been accessed a number of times equal to or greater than a predetermined frequency threshold; and
   wherein detecting the table condition is satisfied comprises determining the bucket has a number of entries equal to or greater than a predetermined depth threshold.

2. The method as recited in claim 1, wherein sorted entries are positioned in a bucket in an order wherein higher frequency accessed entries are more easily accessed.

3. The method as recited in claim 2, wherein said order is a descending order.

4. The method as recited in claim 1, further comprising determining the timing condition is satisfied in response to determining a predetermined number of instructions of the program code have been executed.

5. The method as recited in claim 1, wherein the program regions comprise one or more of the following: basic blocks, paths, strata, and stratum layers.

6. A computing system comprising:
   one or more processors comprising one or more processor cores;
   a memory coupled to the one or more processors, wherein the memory stores a program comprising program code;
   wherein a processor of the one or more processors is configured to execute program instructions which when executed are operable to:
   instrument program code to identify a sequence of basic blocks in dynamic program order;
   store characterization information corresponding to program regions of the program code in a hash table, said hash table comprising a plurality of buckets wherein each bucket comprises a plurality of entries; and
   sort entries of a bucket of the hash table, in response to detecting a timing condition and a table condition are satisfied;

wherein detecting the timing condition is satisfied comprises determining an entry of the bucket has been accessed a number of times equal to or greater than a predetermined frequency threshold; and wherein detecting the table condition is satisfied comprises determining the bucket has a number of entries equal to or greater than a predetermined depth threshold.

7. The computing system as recited in claim 6, wherein sorted entries are positioned in a bucket in an order wherein higher frequency accessed entries are more easily accessed.

8. The computing system as recited in claim 7, wherein said order is a descending order.

9. The computing system as recited in claim 6, wherein the program profiler is further configured to determine the timing condition is satisfied in response determining to a predetermined number of instructions of the program code have been executed.

10. The computing system as recited in claim 6, wherein the program regions comprise one or more of the following: basic blocks, paths, strata, and stratum layers.

11. A computer readable storage medium storing program instructions operable to perform bounded hash table sorting during dynamic whole program profiling of program code, wherein as the program code executes the program instructions are executable to:

instrument program code to identify a sequence of basic blocks in dynamic program order;

store characterization information corresponding to program regions of the program code in a hash table, said hash table comprising a plurality of buckets wherein each bucket comprises a plurality of entries; and sort entries of a bucket of the hash table, in response to detecting a timing condition and a table condition are satisfied;

wherein detecting the timing condition is satisfied comprises determining an entry of the bucket has been accessed a number of times equal to or greater than a predetermined frequency threshold; and wherein detecting the table condition is satisfied comprises determining the bucket has a number of entries equal to or greater than a predetermined depth threshold.

12. The storage medium as recited in claim 11, further comprising determining the timing condition is satisfied in response to determining a predetermined number of instructions of the program code have been executed.

* * * * *